United States Patent
Tanigawa et al.

(10) Patent No.: US 8,040,926 B2
(45) Date of Patent: Oct. 18, 2011

(54) MULTI-CORE FIBER FOR OPTICAL PUMPING DEVICE AND MANUFACTURING METHOD THEREOF, OPTICAL PUMPING DEVICE, FIBER LASER AND FIBER AMPLIFIER

(75) Inventors: Shoji Tanigawa, Sakura (JP); Michihiro Nakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/597,677

(22) PCT Filed: Apr. 24, 2008

(86) PCT No.: PCT/JP2008/057915
§ 371 (c)(1),
(2), (4) Date: Oct. 26, 2009

(87) PCT Pub. No.: WO2008/136344
PCT Pub. Date: Nov. 13, 2008

(65) Prior Publication Data
US 2010/0118897 A1    May 13, 2010

(30) Foreign Application Priority Data
Apr. 27, 2007   (JP) ................................. 2007-120271

(51) Int. Cl.
*H01S 3/30* (2006.01)
(52) U.S. Cl. ........................................................... 372/6
(58) Field of Classification Search ....................... 372/6
See application file for complete search history.

(56) References Cited

U.S. PATENT DOCUMENTS

| | | | |
|---|---|---|---|
| 4,932,740 A | 6/1990 | Berkey et al. | |
| 5,129,021 A | 7/1992 | Mortimore et al. | |
| 5,268,979 A | 12/1993 | Weidman | |
| 5,339,372 A * | 8/1994 | Miller et al. | 385/29 |
| 5,710,850 A * | 1/1998 | Watanabe et al. | 385/71 |
| 7,016,573 B2 | 3/2006 | Dong et al. | |
| 2005/0232561 A1* | 10/2005 | Murofushi et al. | 385/125 |

FOREIGN PATENT DOCUMENTS

| | | |
|---|---|---|
| DE | 10357000 A1 | 7/2005 |
| JP | 6-067055 A | 3/1994 |
| JP | 6-235841 A | 8/1994 |
| JP | 7-140346 A | 6/1995 |
| JP | 2001-068766 A | 3/2001 |

OTHER PUBLICATIONS

Tanaka et al. "Pump Combiner that utilizes capillary for designing flexibility" Proceedings of the IEICE General Conference, B-13-29, 2006.
K. Shiraki et al, "Scattering Property of Fluorine-Doped Silica Glasses", Electronics Letters, vol. 28 No. 17, Aug. 13, 1992.

* cited by examiner

*Primary Examiner* — Kinam Park
(74) *Attorney, Agent, or Firm* — Sughrue Mion, PLLC

(57) ABSTRACT

A multi-core fiber for an optical pumping device is provided. The multi-core fiber includes a plurality of optical fibers that are inserted into holes of an alignment member. The optical fibers and the alignment member are integrated by heating. The alignment member includes a material that has a lower softening temperature than a softening temperature of the optical fibers.

10 Claims, 3 Drawing Sheets

MULTI-CORE FIBER FOR OPTICAL PUMPING DEVICE AND MANUFACTURING METHOD THEREOF, OPTICAL PUMPING DEVICE, FIBER LASER AND FIBER AMPLIFIER

CROSS-REFERENCE TO RELATED APPLICATIONS

This application is the National Stage entry of PCT/JP2008/057915, which was filed in the Japanese Patent Office on Apr. 24, 2008, and claims priority from Japanese Patent Application No. 2007-120271, which was filed in the Japanese Patent Office on Apr. 27, 2007. The entire disclosures of these applications are hereby incorporated by reference.

BACKGROUND OF THE INVENTION

1. Field of the Invention

Apparatuses and methods consistent with the present invention relate to optical amplification technology and optical oscillation technology, and in particular to an optical pumping device that is a combiner of pumping light and signal light, a multi-core fiber that is a component thereof and a manufacturing method thereof, an optical pumping device that uses the multi-core fiber, and a fiber laser and a fiber amplifier that use the optical pumping device.

2. Description of the Related Art

As a related art optical pumping device, a pump combiner that uses a multi-hole capillary has been proposed (for example, refer to Non-Patent Document 1).

Also, as a combiner of pumping light and signal light, for example, the technology disclosed in Patent Documents 1 to 7 has been proposed.

[Non-Patent Document 1] Tanaka, Tanigawa, Nakai, Sakai, Himeno, "Pump Combiner that utilizes capillary for designing flexibility" Proceedings of the IEICE General Conference, B-13-29, 2006.
[Patent Document 1] Japanese Unexamined Patent Application, First Publication No. H07-140346
[Patent Document 2] Japanese Unexamined Patent Application, First Publication No. H06-67055
[Patent Document 3] Japanese Unexamined Patent Application, First Publication No. H06-235841
[Patent Document 4] U.S. Pat. No. 5,268,979
[Patent Document 5] U.S. Pat. No. 5,339,372
[Patent Document 6] U.S. Pat. No. 7,016,573
[Patent Document 7] U.S. Pat. No. 5,129,021

However, there are the following problems in the related art mentioned above.

The multi-hole capillary (alignment member) that is disclosed in Non-Patent Document 1 is substantially made from nearly pure silica similarly to the constituent material of the optical fibers to be inserted, and the softening temperature of the alignment member is not taken into account.

If the softening temperature of the optical fibers to be inserted and the softening temperature of the alignment member are the same, or the softening temperature of the alignment member is higher, the optical fibers become soft at nearly the same time as or earlier than the alignment member when fusion integrating by heating. This causes (A) deformation of the cross-sectional shape of the inserted fibers and (B) bending of the inserted fibers. Therefore, the following problems arise: (1) the numerical aperture (NA) of the fiber that guides the pumping light effectively increases, and the splice loss between a multi-core fiber and a bridge fiber or double-clad fiber downstream thereof increases, and (2) due to the inserted fibers becoming fusion integrated in a bent state, loss of the signal light and pumping light occurs (or increases) due to the bending. Accordingly, the multi-hole capillary made of silica that is disclosed in Non-Patent Document 1 has the above problems (1) and (2).

In all the devices that are disclosed in Patent Documents 1 to 5, the alignment member is not a multi-hole structure.

The device disclosed in Patent Document 6 involves a system of bundling optical fibers in a single-hole capillary, but an alignment member having a multi-hole structure not disclosed. Also, in Patent Document 6, there is no disclosure with respect to the softening temperature of the material.

The device disclosed in Patent Document 7 was not designed by taking the softening temperature into account. Also, it is a structure that achieves coupling by elongating the capillary itself, and is not a multi-core fiber of a type that splices with a double-clad fiber that has a rare earth-doped core via a separately elongated bridge fiber.

SUMMARY OF THE INVENTION

The present invention was achieved in view of the above circumstances, and has an object of providing a low-cost and high-performance multi-core fiber with little deformation of optical fibers when fusion integrating an alignment member and the optical fibers.

In order to achieve the above object, an exemplary aspect of the present invention provides a multi-core fiber including a plurality of optical fibers that are inserted into holes of an alignment member. The optical fibers and the alignment member are integrated by heating. The alignment member comprises a material that has a lower softening temperature than a softening temperature of the optical fibers.

The alignment member may be made of fluorine-doped silica glass. A fluorine doping concentration of the fluorine-doped silica glass may yield a relative refractive index difference with silica glass between −0.25% and −0.35%.

The aligning member may be a multi-hole capillary.

Also, an exemplary aspect of the present invention provides a method of manufacturing a multi-core fiber, which includes inserting a plurality of optical fibers into holes of an alignment member, and performing fusion integration of the optical fibers and the alignment member by using a thermal process. The alignment member includes a material that has a lower softening temperature than a softening temperature of the optical fibers.

The thermal process may use a flame torch.

The thermal process may use laser heating. Also, an exemplary aspect of the present invention provides an optical pumping device, in which the multi-core fiber is used.

Also, an exemplary aspect of the present invention provides a fiber laser, in which the optical pumping device is used.

Also, an exemplary aspect of the present invention provides a fiber amplifier, in which the optical pumping device is used.

The multi-core fiber for an optical pumping device according to exemplary embodiments of the present invention (hereinbelow referred to as the multi-core fiber) uses as the alignment member a material with a lower softening point than the optical fibers. Accordingly, when the optical fibers are inserted in the alignment member and heated to be fusion integrated, since the alignment member deforms prior to the optical fibers, it is possible to prevent deformation of the optical fibers. As a result, 1) pumping light loss can be reduced by preventing non-circularity of the optical fibers, 2) signal light and pumping light loss can be reduced by preventing bend of the optical fibers, 3) as a result of these, the yield of the multi-core fiber can be improved.

Accordingly, according to exemplary embodiments of the present invention, it is possible to provide a low-cost and high-performance multi-core fiber.

In the multi-core fiber of exemplary embodiments of the present invention, by manufacturing the alignment member with fluorine-doped silica glass, it is possible to significantly lower the softening temperature, and so manufacturing becomes easy. Fluorine-doped silica glass is an example of the material of the alignment member used in exemplary embodiments of the present invention. By using the alignment member made of fluorine-doped silica glass, manufacturing of the alignment member becomes inexpensive and a high yield becomes possible.

Also, by using the alignment member made of fluorine-doped silica glass, since the refractive index of the portion of the alignment member becomes lower than the silica glass that constitutes the optical fiber, the wave guide structure of the multi-core fiber can be optimized.

In the multi-core fiber of exemplary embodiments of the present invention, by using a multi-hole capillary as the alignment member, manufacturing of the multi-core fiber becomes easy and it is possible to provide an inexpensive alignment member.

Since the method of manufacturing the multi-core fiber of exemplary embodiments of the present invention obtains a multi-core fiber by inserting a plurality of optical fibers in an alignment member and performing fusion integration using a thermal process, it is possible to manufacture a low-cost and high-performance multi-core fiber.

In the manufacturing method of exemplary embodiments of the present invention, in the case of using a flame torch as the thermal process, the manufacturing equipment becomes simple. Also, local heating becomes possible. Also, it is easy to control the flame.

In the manufacturing method of exemplary embodiments of the present invention, in the case of using laser heating as the thermal process, the laser excels at local heating, and the controllability is high.

Since the optical pumping device of exemplary embodiments of the present invention uses the low-cost multi-core fiber having low insertion loss as mentioned above, it is possible to provide a low-cost and high-performance optical pumping device.

Since the fiber laser of exemplary embodiments of the present invention uses a low-cost and high-performance optical pumping device as mentioned above, it is possible to provide a low-cost and high-performance fiber laser.

Since the fiber amplifier of exemplary embodiments of the present invention uses a low-cost and high-performance optical pumping device as mentioned above, it is possible to provide a low-cost and high-performance fiber amplifier.

DETAILED DESCRIPTION OF EXEMPLARY EMBODIMENTS OF THE INVENTION

Hereinbelow, an exemplary embodiment of the present invention shall be described with reference to the drawings.

Figure 1A:
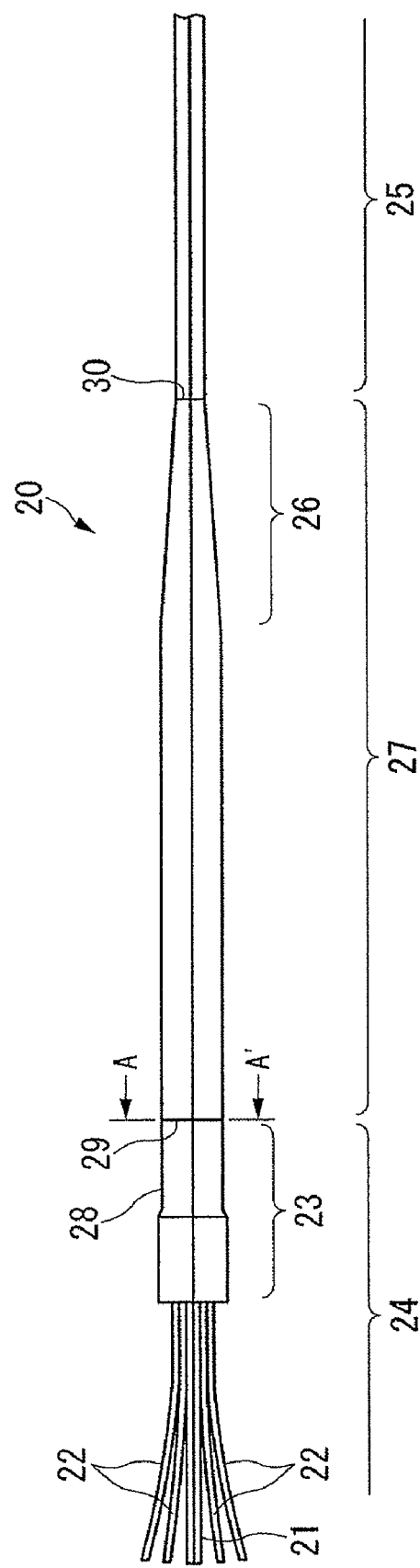
FIG. 1A shows a side view of an optical pumping device according to an exemplary embodiment of the present invention.
Figure 1B:
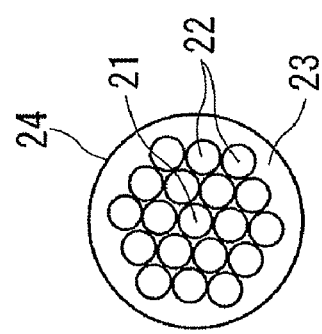
FIG. 1B shows a cross-sectional view taken along line A-A' of the optical pumping device shown in FIG. 1A.

FIG. 1A shows a side view of an optical pumping device according to an exemplary embodiment of the present invention, and FIG. 1B shows a cross-sectional view taken along line A-A' of the optical pumping device shown in FIG. 1A. The optical pumping device 20 of the exemplary embodiment shown in FIGS. 1A and 1B is formed by splicing a multi-core fiber 24 and a double-clad fiber 25 that has a rare earth-doped core for optical pumping via a bridge fiber 27 that consists of a double-clad fiber having a tapered portion 26. Here, the multi-core fiber 24 is formed by inserting a signal port 21 and a plurality of pump ports 22 as input ports into a multi-hole capillary 23 and contracting gap portions. Here, the signal port 21 is the distal end portion of an optical fiber for signal light, the pump ports 22 are the distal end portions of optical fibers for pumping light, and the multi-hole capillary 23 consists of glass with a lower softening temperature than these optical fibers.

The above-mentioned multi-core fiber 24 has a structure in which the signal port 21 and the plurality of pump ports 22 are inserted in the multi-hole capillary 23 and a portion thereof is heated to contract the gap portions such that an integrated contracted portion 28 is formed. Here, the multi-hole capillary 23 is an alignment member that consists of glass with a lower softening temperature than the optical fibers and which has a plurality of fine holes in which the input ports (the signal port 21 and the plurality of pump ports 22) are arranged so as to be three-dimensionally aligned.

As shown in FIG. 1B, in the multi-hole capillary 23 that has a cylindrical shape, 19 fine holes for port insertion are formed to be closely aligned. Then, the signal port 21 is inserted into the center hole of this multi-hole capillary 23, and 18 pump ports 22, specifically six pump ports of a first layer and 12 pump ports of a second layer, are inserted into the holes located at the periphery thereof. Accordingly, a structure is achieved in which the multi-hole capillary 23 and the input ports are integrated at the contracted portion 28. Note that although not illustrated, the other end side of each pump port 22 is spliced to the output end of a pumping light source such as a laser diode (LD) or the like, so as to be able to propagate pumping light having a specific wavelength from the pumping light source to this optical pumping device 20.

The above-mentioned multi-hole capillary 23 can be made from a material in which at least one element that is selected from a group consisting of fluorine, phosphorous, boron, germanium, aluminum, and chlorine (phosphorous, boron, germanium, aluminum exist in the silica glass as oxides) is added to silica glass. For example, fluorine-doped silica glass may be used. By fabricating the alignment member with fluorine-doped silica glass, it is possible to significantly lower the softening temperature, and so manufacturing of the multi-core fiber becomes easy. By using the multi-hole capillary 23 made of fluorine-doped silica glass, manufacturing of the multi-core fiber becomes inexpensive and a high yield becomes possible. Moreover, by using the multi-hole capillary 23 made of fluorine-doped silica glass, since the refractive index of the portion of the multi-hole capillary 23 becomes lower than the silica glass that constitutes the optical fiber, the wave guide structure of the multi-core fiber is optimized.

Although the number of fine holes of the multi-hole capillary 23 is not limited, it may be 3 or more or 100 or less.

Among the signal port 21 and the plurality of pump ports 22, which are optical fibers inserted in the holes of the multi-hole capillary 23, the core diameter of the optical fiber for the signal port 21 may be between about 4.5 µm and 30 µm. Also, the core diameter of the optical fiber for the pump ports 22 may be between about 50 µm and 110 µm.

As the method of manufacturing the multi-hole capillary 23, it is possible to use a method that inserts a plurality of optical fibers (the signal port 21 and the plurality of pump ports 22) in the holes of the multi-hole capillary 23 made of glass with a low softening point such as the fluorine-doped silica glass and performs fusion integration using a thermal process. By this method, it is possible to manufacture a low-cost and high-performance multi-core fiber.

As the thermal process, it is possible to use a flame torch such as an oxy-hydrogen burner or an acetylene burner or the like, an electric heat coil, or laser heating such as a $CO_2$ laser or the like.

In the manufacturing method of exemplary embodiments of the present invention, in the case of using a flame torch as a thermal process, the manufacturing equipment becomes simple. Also, local heating becomes possible. Moreover, it is easy to control the flame.

In the manufacturing method of exemplary embodiments of the present invention, when using laser heating as a thermal process, the laser excels in local heating and controllability is high.

The outer diameter of the multi-core fiber 24 obtained by the manufacturing method depends on the number of the holes (that is, the number of pump ports 22 to be inserted), but is normally between about 400 µm and 2000 µm.

The bridge fiber 27 should be able to efficiently propagate the light that propagates through the multi-core fiber 24 to the double-clad fiber 25 for optical pumping and, for example, a double-clad fiber or the like that has an outer diameter similar to that of the distal end face of the multi-core fiber 24 is used. The tapered portion 26 that is formed in this bridge fiber 27 is formed by heating and elongating one end of the bridge fiber 27 and gradually reducing the outer diameter of the fiber. The outer diameter of the end face of the tapered portion 26 may be equal to the outer diameter of the double-clad fiber 25 spliced thereto.

A splicing point 29 between the multi-core fiber 24 and the bridge fiber 27 and a splicing point 30 between the bridge fiber 27 and the double-clad fiber 25 are fusion spliced in order to ensure long-term mechanical reliability. Thereby, antireflection coatings and the like becomes unnecessary on the splicing portions, leading to a reduction in manufacturing steps, and it is possible to improve the tolerance to high-power light. Moreover, stable optical characteristics with few fluctuations over time are acquired. The heat source used for fusion splice of the splicing points 29 and 30 may include arc discharge, $CO_2$ laser, an oxy-hydrogen flame, and the like.

In the optical pumping device 20 of the present embodiment, the pumping light is input to the double-clad fiber 25 via the bridge fiber 27 through the plurality of pump ports 22 of the multi-core fiber 24 to excite rare earth ions that have been doped into the core of this double-clad fiber 25. Then, when the signal light is input through the signal port 21, optical pumping occurs in the double-clad fiber 25, and amplified light is output from the other end (output end) side not illustrated of the double-clad fiber 25. This optical pumping device 20 can be applied to a fiber amplifier or a fiber laser and the like. In particular, since the pumping light from the plurality of pump ports 22 can be efficiently input to the double-clad fiber 25 for optical pumping, it is possible to provide a fiber amplifier that is capable of high-power optical amplification or a high-power fiber laser.

The optical pumping device 20 of the present exemplary embodiment is configured by splicing the multi-core fiber 24, obtained by bundling the distal end portions of the input ports (the signal port 21 and the plurality of pump ports 22) with the multi-hole capillary 23, and the double-clad fiber 25 for optical pumping, via the bridge fiber 27 that has the tapered portion 26. Accordingly, three-dimensional alignment of the input ports becomes easy, and the splice can be accomplished without deforming the input ports, such that it is possible to efficiently couple the signal light and the pumping light into the double-clad fiber 25 for optical pumping.

In the present exemplary embodiment, in order to easily integrate the input ports (the signal port 21 and the plurality of pump ports 22), the multi-hole capillary 23 is used. After inserting the optical fibers as the respective ports into the individually formed holes of the multi-hole capillary 23, the vicinity of the end portion thereof is heated to contract only the portion of the gaps that exist between the holes of the multi-hole capillary 23 and the input ports and thereby integrate them, whereby the multi-core fiber 24 is formed. Accordingly, aligning the plurality of optical fibers in a three-dimensional manner becomes easy. Moreover, since the multi-hole capillary 23 is manufactured with a material having a lower softening point than the optical fibers, when the optical fibers are inserted in the multi-hole capillary 23 and they are both heated to fusion integrate them, since the multi-hole capillary 23 deforms prior to the optical fibers, it is possible to prevent deformation of the optical fibers. As a result: 1) pumping light loss can be reduced by preventing non-circularity of the optical fibers, 2) signal light and pumping light loss can be reduced by preventing bend of the optical fibers, and 3) as a result of these, the yield of the multi-core fiber can be improved.

Accordingly, by using this multi-hole capillary 23, it is possible to provide a low-cost and high-performance multi-core fiber.

If a structure that integrates the input ports by using this kind of multi-hole capillary 23 is adopted, by appropriately setting the number and arrangement of the holes formed in the multi-hole capillary 23, it is possible to easily cope with future requirements for an increase in the number of pump ports. Also, it is possible to suppress deformation of the pump ports during the contraction and integration process. Moreover, since the profile of the bridge fiber 27, including the outer diameter of the clad, the diameter of the core, the length of the tapered portion, the outer diameter of the tapered portion, a mode field diameter, a relative refractive index difference and the like can be separately optimized, it is possible to also cope with requirements for an increase of the pump ports 22 comparatively easily.

Furthermore, in the related art, the only possible arrangement of the pump ports is that of a close-packed structure of the pump port optical fibers. As a result, in the case of the number of pump ports being six or less, the pumping light can be efficiently input into the clad pumping fiber in the prior art. However, when the number of pump ports is greater than seven, due to the close-packed structure, the arrangement of the pump ports become the same structure as an 18-port structure. Moreover, as stated above, there is a large deformation of the pump ports in an 18-port structure, which entails manufacturing difficulties.

Meanwhile, the optical pumping device 20 according to exemplary embodiments of the present invention employs the multi-core fiber 24 that uses the multi-hole capillary 23, and by appropriately designing the multi-hole structure thereof, can achieve a pumping structure of any given number of ports. FIGS. 2A-2F show examples of pump port arrangement structures of multi-core fibers that use multi-hole capillaries according to the present invention. In FIGS. 2A-2F, reference numerals 40A to 40F denote multi-core fibers, 41A to 41F denote multi-hole capillaries, 42 denotes a signal port, 43 denotes a signal port core, 44 denotes a signal port cladding, 45 denotes a pump port, 46 denotes a pump port core, and 47 denotes a pump port clad. In the examples shown in FIGS. 2A-2F, a single mode optical fiber is used for the signal port 42, and a multi-mode optical fiber is used for the pump ports 45.

Figure 2A:
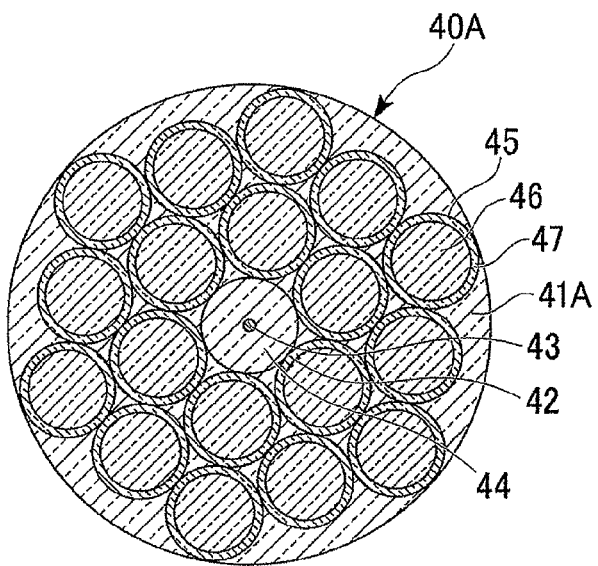
FIGS. 2A-2F show cross-sectional views of the multi-core fiber of exemplary embodiments of the present invention.

The multi-core fiber 40A shown in FIG. 2A has a pump port arrangement structure in which the signal port 42 is inserted into a center hole and the pump ports 45 are inserted into a total of 18 holes, consisting of six holes of a first layer and 12 holes of a second layer, located at the periphery of the signal port 42, using the multi-hole capillary 41A having 19 holes and having a close-packed structure.

Figure 2B:
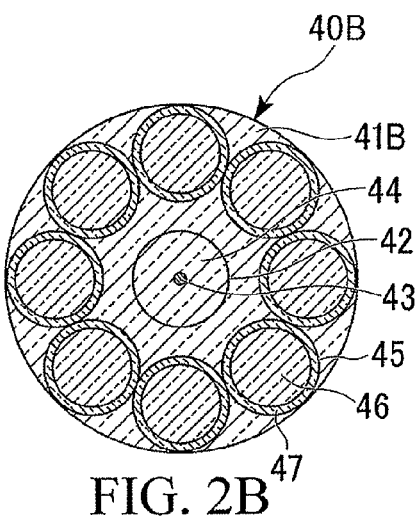

The multi-core fiber 40B shown in FIG. 2B has a pump port arrangement structure in which the signal port 42 is inserted into a center hole and the pump ports 45 are inserted into eight holes located at the periphery thereof using the multi-hole capillary 41B having a total of nine holes, of which one hole is at the center and eight holes are spaced slightly away from the periphery thereof.

Figure 2C:
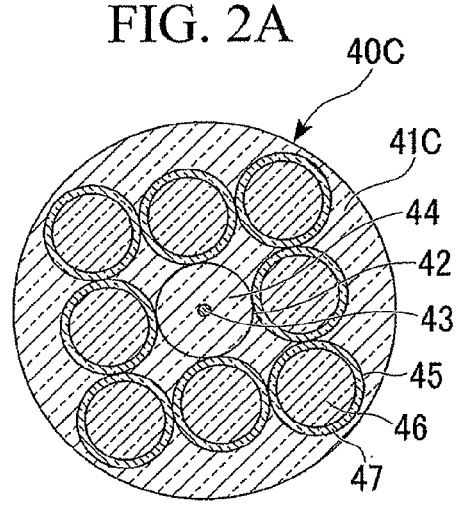

The multi-core fiber 40C shown FIG. 2C has a pump port arrangement structure in which the signal port 42 is inserted into a center hole and the pump ports 45 are inserted into eight holes of first and second layers located at the periphery thereof using the multi-hole capillary 41C having nine holes, of which one is at the center, four holes of the first layer are adjacent to the periphery thereof and four holes of the second layer are spaced slightly away from the center.

Figure 2D:
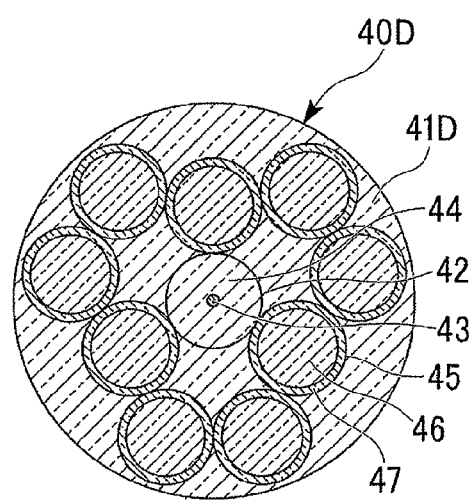

The multi-core fiber 40D shown in FIG. 2D has a pump port arrangement structure in which the signal port 42 is inserted into a center hole and the pump ports 45 are inserted into nine holes of first and second layers located at the periphery thereof using the multi-hole capillary 41D having 10 holes, of which one is at the center, three holes of the first layer are adjacent to the periphery thereof, and six holes of the second layer are provided at the outer periphery thereof.

Figure 2E:
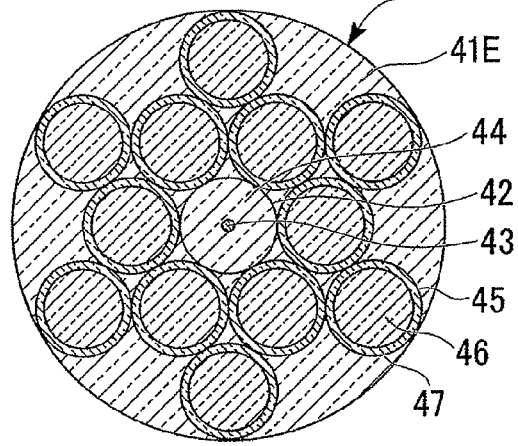

The multi-core fiber 40E shown in FIG. 2E has a pump port arrangement structure in which the signal port 42 is inserted into a center hole and the pump ports 45 are inserted into 12 holes of first and second layers located at the periphery thereof using the multi-hole capillary 41E having 13 holes, of which one is at the center, six holes of the first layer are adjacent to the periphery thereof, and six holes of the second layer are provided at the outer periphery thereof.

Figure 2F:
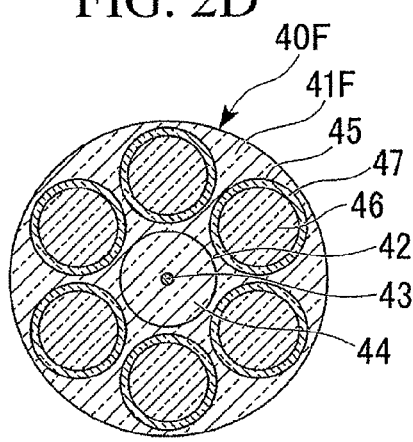

The multi-core fiber 40F shown in FIG. 2F has a pump port arrangement structure in which the signal port 42 is inserted into a center hole and the pump ports 45 are inserted into six holes at the periphery thereof, using the multi-hole capillary 41F having seven holes, of which one is at the center and six holes of the first layer are adjacent to the periphery thereof.

Figure 3:
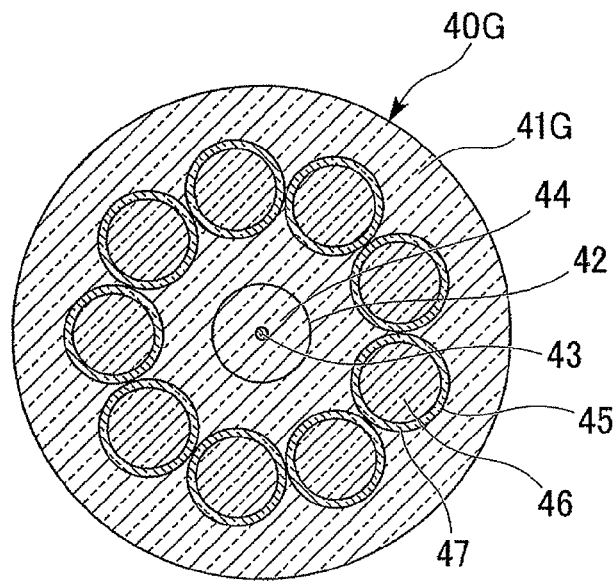
FIG. 3 shows a cross-sectional view of the multi-core fiber of an exemplary embodiment of the present invention.

FIG. 3 is a drawing that shows another arrangement structure, with this exemplary embodiment having a pump port arrangement structure in which the signal port 42 is inserted into a center hole and the pump ports 45 are inserted into nine holes of a first layer at the periphery thereof, using the multi-hole capillary 40G having 10 holes, of which one is at the center and nine holes of the first layer are provided spaced away from the periphery thereof

[Test 1]

The multi-core fibers of Embodiment 1 to Embodiment 12 having the pump port arrangement structures of FIGS. 2A-F and 3 were manufactured. Their details are presented in Table 1.

Note that in Table 1, "Δ" expresses the relative refractive index difference of the multi-hole capillary material with respect to the refractive index of pure silica glass.

Also, the pumping light ovality was obtained by measuring the degree of non-circularity of each core by an optical microscope measurement of the emission end face of the multi-core fiber.

Also, the pumping light insertion loss was calculated by measuring the input light amount and output light amount of the optical pumping device manufactured using the multi-core fiber, and then obtaining the ratio thereof.

Moreover, the loss increase at the signal light after integration was obtained from changes in the light amount before and after integration by monitoring the fluctuations over time in the transmitted light amount of the signal port in the integration step.

TABLE 1

| Embodiment | Alignment Member | Material (Composition) | Holes Arrangement | Inserted Fiber (Excitation) | Inserted Fiber (Signal) | Thermal Processing Method |
|---|---|---|---|---|---|---|
| 1 | Multi-hole capillary | F-doped optical Δ of about −0.3% | 19 (a) of FIG. 2 | 105 μm core 125 μm clad NA = 0.15 | 6 μm core 125 μm clad | Oxy-hydrogen burner |
| 2 | Multi-hole capillary | F-doped optical Δ of about −0.3% | 19 (a) of FIG. 2 | 105 μm core 125 μm clad NA = 0.15 | 4.5 μm core 125 μm clad | Oxy-hydrogen burner |
| 3 | Multi-hole capillary | F-doped optical Δ of about −0.3% | 19 (a) of FIG. 2 | 105 μm core 125 μm clad NA = 0.15 | 6 μm core 125 μm clad | Oxy-hydrogen burner |
| 4 | Multi-hole capillary | F-doped optical Δ of about −0.3% | 10 FIG. 3 | 105 μm core 125 μm clad NA = 0.15 | 4.5 μm core 125 μm clad | Oxy-hydrogen burner |
| 5 | Multi-hole capillary | F-doped optical Δ of about −0.3% | 10 FIG. 3 | 105 μm core 125 μm clad NA = 0.22 | 5 μm core 125 μm clad | Oxy-hydrogen burner |
| 6 | Multi-hole capillary | F-doped optical Δ of about −0.3% | 10 FIG. 3 | 105 μm core 125 μm clad NA = 0.15 | 6 μm core 125 μm clad | $CO_2$ laser |

TABLE 1-continued

| | | | | | | | |
|---|---|---|---|---|---|---|---|
| 7 | Multi-hole capillary | F-doped optical Δ of about −0.3% | 9 | (c) of FIG. 2 | 105 μm core 125 μm clad NA = 0.15 | 4.5 μm core 125 μm clad | Oxy-hydrogen burner |
| 8 | Multi-hole capillary | F-doped optical Δ of about −0.3% | 9 | (c) of FIG. 2 | 105 μm core 125 μm clad NA = 0.15 | 6 μm core 125 μm clad | Oxy-hydrogen burner |
| 9 | Multi-hole capillary | F-doped optical Δ of about −0.3% | 6 | (c) of FIG. 2 | 105 μm core 125 μm clad NA = 0.22 | 6 μm core 125 μm clad | Oxy-hydrogen burner |
| 10 | Multi-hole capillary | F-doped optical Δ of about −0.2% | 10 | FIG. 3 | 105 μm core 125 μm clad NA = 0.15 | 4.5 μm core 125 μm clad | Oxy-hydrogen burner |
| 11 | Multi-hole capillary | P-F doped P: optical Δ of about 0.2% F: optical Δ of about −0.3% | 10 | FIG. 3 | 105 μm core 125 μm clad NA = 0.15 | 4.5 μm core 125 μm clad | $CO_2$ laser |
| 12 | Multi-hole capillary | Ge-F doped Ge: optical Δ of about 0.3% F: optical Δ of about −0.5% | 19 | (a) of FIG. 2 | 105 μm core 125 μm clad NA = 0.15 | 5 μm core 125 μm clad | Oxy-hydrogen burner |

| Embodiment | Flow Rate/Time | Outer Diameter | Pumping Light Ovality | Pumping Light Insertion Loss (Due to Ovality) | Loss Increase at Signal Light after Integration (Due to Bending) |
|---|---|---|---|---|---|
| 1 | $O_2$: 500 cc/min $H_2$: 80 cc/min Process time: about 1 min | 980 μm | Max. 10% | Average of 0.25 dB for all ports | 0.8 dB |
| 2 | $O_2$: 500 cc/min $H_2$: 80 cc/min Process time: about 1 min | 940 μm | Max. 11% | Average of 0.18 dB for all ports | 0.4 dB |
| 3 | $O_2$: 500 cc/min $H_2$: 80 cc/min Process time: about 1 min | 940 μm | Max. 4% | Average of 0.22 dB for all ports | 0.6 dB |
| 4 | $O_2$: 500 cc/min $H_2$: 80 cc/min Process time: about 25 sec | 740 μm | Max. 6% | Average of 0.10 dB for all ports | 1.1 dB |
| 5 | $O_2$: 300 cc/min $H_2$: 40 cc/min Process time: about 1 min | 680 μm | Max. 2% | Average of 0.08 dB for all ports | 1.3 dB |
| 6 | About 2 min heating | 780 μm | Max. 8% | Average of 0.15 dB for all ports | 0.3 dB |
| 7 | $O_2$: 300 cc/min $H_2$: 40 cc/min Process time: about 1 min | 680 μm | Max. 7% | Average of 0.11 dB for all ports | 0.8 dB |
| 8 | $O_2$: 300 cc/min $H_2$: 40 cc/min Process time: about 1 min | 630 μm | Max. 4% | Average of 0.12 dB for all ports | 0.4 dB |
| 9 | $O_2$: 300 cc/min $H_2$: 40 cc/min Process time: about 30 sec | 520 μm | Max. 4% | Average of 0.20 dB for all ports | 0.3 dB |
| 10 | $O_2$: 300 cc/min $H_2$: 40 cc/min Process time: about 30 sec | 740 μm | Max. 8% | Average of 0.24 dB for all ports | 0.9 dB |
| 11 | About 2 min heating | 740 μm | Max. 7% | Average of 0.30 dB for all ports | 0.7 dB |
| 12 | $O_2$: 200 cc/min $H_2$: 15 cc/min Process time: about 1 min | 1040 μm | Max. 2% | Average of 0.33 dB for all ports | 0.7 dB |

According to Table 1, the multi-core fibers of Embodiment 1 to Embodiment 12 can suppress effects due to deformation such as bend of the optical fibers and can guide the signal light and pumping light with a low loss, regardless of the structural arrangement of the pump ports.

In an application based on Table 1, an alignment member with a fluorine doping concentration that yields a relative refractive index difference with silica glass between −0.25% and −0.35% may be used.

Based on the manufacturing conditions of the multi-core fiber of Embodiment 2, the frequency distribution of the loss increase of the optical fiber after integration was investigated in the case of using the multi-hole capillary (fluorine-doped silica capillary) with 19 holes made of fluorine-doped silica glass as described in Embodiment 2, and the case of using a pure silica capillary with 19 holes made of pure silica glass. The result is shown in the histogram of FIG. 4.

Figure 4:
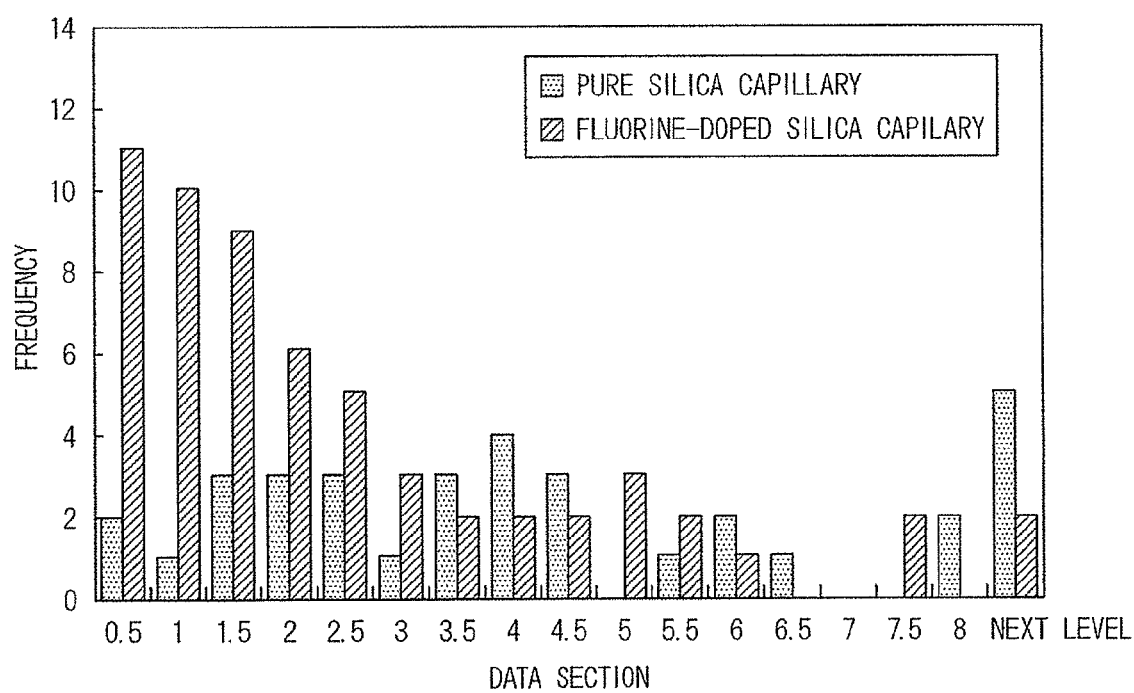
FIG. 4 shows a histogram of the frequency distribution of the loss increase of the optical fibers after integration into the multi-core fiber according to an exemplary embodiment of the present invention.

From the result of FIG. 4, the loss increase level significantly decreased in the case of using the fluorine-doped silica capillary, compared to the case of using a pure silica capillary, thus proving as a product group that loss reduction and yield improvement are possible.

According to exemplary embodiments of the present invention, it is possible to provide a low-cost and high-performance multi-core fiber with little deformation of optical fibers when fusion integrating the alignment member and the optical fibers.

The invention claimed is:
1. A multi-core fiber comprising a plurality of optical fibers that are inserted into holes of an alignment member, wherein:

the optical fibers and the alignment member are integrated by heating, the alignment member comprises a material that has a lower softening temperature than a softening temperature of the optical fibers, the alignment member comprises fluorine-doped silica glass, and a fluorine doping concentration of the fluorine-doped silica glass yields a relative refractive index difference with silica glass between −0.25% and −0.35%.

2. The multi-core fiber according to claim 1, wherein the alignment member is a multi-hole capillary.

3. A method of manufacturing a multi-core fiber, the method comprising:

inserting a plurality of optical fibers into holes of an alignment member; and performing fusion integration of the optical fibers and the alignment member by using a thermal process, wherein the alignment member comprises a material that has a lower softening temperature than a softening temperature of the optical fibers, the alignment member comprises fluorine-doped silica glass, and a fluorine doping concentration of the fluorine-doped silica glass yields a relative refractive index difference with silica glass between −0.25% and −0.35%.

4. The method according to claim 3, wherein the alignment member is a multi-hole capillary.

5. An optical pumping device comprising the multi-core fiber according to claim 1.

6. An optical pumping device comprising the multi-core fiber according to claim 2.

7. A fiber laser comprising the optical pumping device according to claim 5.

8. A fiber laser comprising the optical pumping device according to claim 6.

9. A fiber amplifier comprising the optical pumping device according to claim 5.

10. A fiber amplifier comprising the optical pumping device according to claim 6.

* * * * *